March 6, 1928.

E. R. MORTON

VARIOCOUPLER

Filed March 1, 1923

1,661,380

Inventor
Edmund R. Morton
By his Attorneys
Cooper, Kerr & Dunham

Patented Mar. 6, 1928.

1,661,380

UNITED STATES PATENT OFFICE.

EDMUND R. MORTON, OF NEW YORK, N. Y., ASSIGNOR TO FAIRCHILD AERIAL CAMERA CORPORATION, OF NEW YORK, N. Y., A CORPORATION OF NEW YORK.

VARIOCOUPLER.

Application filed March 1, 1923. Serial No. 622,035.

This invention relates to vario-couplers or variable mutual inductances.

The chief object of my invention is to provide a vario-coupler having a plurality of secondary circuits, separately and independently excitable from a single primary circuit, adaptable to various purposes, among which may be mentioned the positional control device described and claimed in the copending application of Sherman M. Fairchild and myself, Serial No. 622,036.

My invention comprises the combination of a primary circuit, with a plurality of secondary coils connected in a plurality of circuits and so arranged that any one or more secondary circuits may be excited at will, without exciting the other circuit or circuits. A simple and convenient embodiment is illustrated diagrammatically in the accompanying drawings, in which Fig. 1 shows a system employing four secondary coils.

Figure 1:
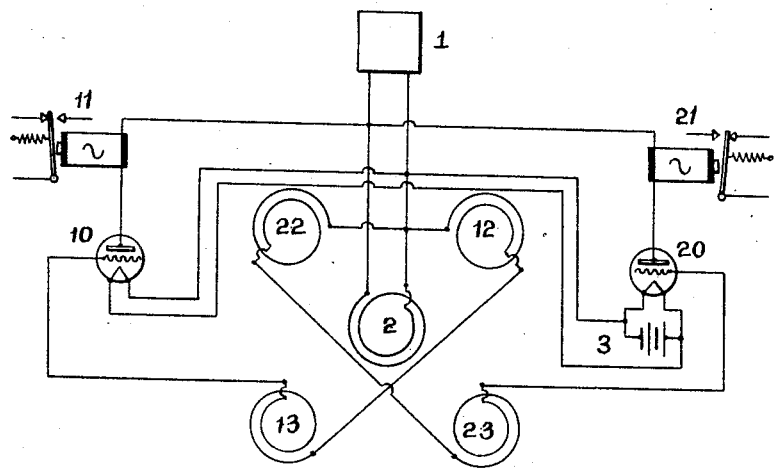
Figure 2:
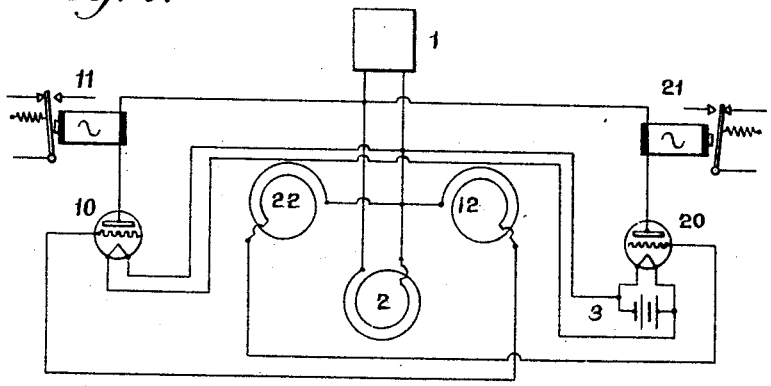
Fig. 2 shows a modification, in which two secondary coils are employed.
Figure 3:
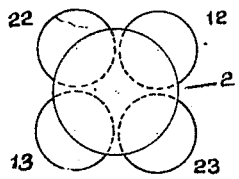
Figs. 3 and 4 show preferred arrangements of the coils of Figs. 1 and 2 respectively.
Figure 4:
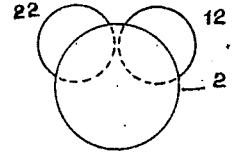

Referring to Figs. 1 and 2, any convenient source of alternating current, as for example an Alexanderson generator, is indicated at 1, to supply current to the primary coil 2 of the vario-coupler and to the plates of the vacuum tubes 10 and 20 through the A. C. relays 11 and 21. These relays represent any convenient means of utilizing the current through the vacuum tubes, as for example to control the armature circuits of electric motors not shown. The battery 3 supplies current to heat the filaments of both vacuum tubes 10 and 20. In Fig. 1 the secondary coils 12 and 13 are connected in opposition to the grid of the vacuum tube 10 and the secondary coils 22 and 23 are connected in opposition to the grid of the vacuum tube 20. In Fig. 2 the secondary coils 13 and 23 are omitted. In Figs. 1 and 2 the secondary coils are shown separated for convenience of illustration, but Figs. 3 and 4 show them closely grouped, as may be convenient in actual construction. It will be seen by those skilled in the art, that when coil 2 of Figs. 1 and 3 is symmetrically placed, with reference to either pair of coils, as 12 and 13, the electromotive forces induced in them will neutralize, producing no potential on the grid of vacuum tube 10, but that coil 2 can be moved toward coil 22 or 23, preserving this symmetry and consequent balance of potentials in coils 12 and 13, but producing unbalanced potentials in coils 22 and 23 thereby applying a resultant potential to the grid of vacuum tube 20, positive or negative, with respect to the primary voltage applied to the plate of the vacuum tube. Likewise coil 2 can be moved so as to be unsymmetrical with respect to both pairs of secondary coils, producing potentials applied to the grids of both vacuum tubes, in various combinations depending on the motions of coil 2.

In a similar manner, when coil 2, Figs. 2 and 4, is just half overlapping coil 12, no electromotive force will be induced in the latter coil, and coil 2 can then be moved about the center of coil 12 increasing or decreasing the overlap of coil 2 on coil 22. An electromotive force will then be induced in coil 22, positive or negative, with respect to the primary potential according to the direction of the motion. This potential is applied to the grid of vacuum tube 10, controlling the flow of plate current through the tube.

It will be seen that the grid potential of vacuum tubes 10 and 20 can be varied independently or together at will, from the various motions of a single primary coil 2. These grid potentials control the plate current through the relays 11 and 21 causing either or both relays to operate or not operate, for such purposes as may be desirable.

This invention is not only capable of application to the devices described, but may be applied in various arts and capable of various uses to which a vario-coupler having a plurality of secondary circuits might be applied.

In accordance with the provisions of the patent statutes I have described the principles of operation of my invention together with the apparatus which I now consider to represent the best embodiment thereof, but I desire to have it understood that the construction and application shown is only illustrative and that the invention can be carried out by other means within the scope of the appended claims.

What I claim is:—

1. A vario-coupler comprising a plurality of secondary coils spaced transversely and connected to form a plurality of secondary circuits, and a primary coil spaced axially from the secondary coils and movable transversely to the secondary coils to vary the distance between its axis and that of each of the secondary coils.

2. A vario-coupler comprising a plurality of secondary coils spaced transversely and connected to form a plurality of secondary circuits, and means comprising a primary coil for inducing electromotive forces in said secondary coils, said primary coil being spaced axially from the secondary coils and movable transversely to the secondary coils, to vary the electromotive force induced in either of two of the secondary circuits without varying the electromotive force in the other secondary circuit.

3. A vario-coupler, comprising a plurality of secondary coils, placed transversely and connected to form a plurality of secondary circuits and means comprising a primary coil for inducing electromotive forces in said secondary coils, said primary coil being spaced axially from the secondary coils and movable transversely to the secondary coils, to vary the electromotive force induced in either of two of the secondary circuits while maintaining the electromotive force induced in the other secondary circuit constant.

4. In combination, a vario-coupler and connected circuits comprising a primary circuit, a plurality of secondary circuits, and means for varying the electromotive force induced in either of two of the secondary circuits without varying the electromotive force induced in the other secondary circuit.

5. In combination, a vario-coupler and connected circuits comprising a primary circuit, a plurality of secondary circuits, and means for varying the electromotive force induced in either of two of the secondary circuits, while maintaining the electromotive force induced in the other secondary circuit constant.

6. The combination with a vario-coupler and connected circuits comprising a primary circuit, a plurality of secondary circuits, and means for varying the electromotive force induced in either of two of the secondary circuits while maintaining the electromotive force induced in the other circuit constant, of a plurality of relays each connected to a corresponding one of said secondary circuits.

7. A vario-coupler comprising in combination, a primary coil, and a plurality of pairs of secondary coils, the said primary coil being relatively movable with respect to said secondary coils and the secondary coils of each pair being so electrically connected as to cause electromotive force induced in one by varying current through the primary coil to oppose that induced in the other.

In testimony whereof I hereto affix my signature.

EDMUND R. MORTON.